Dec. 14, 1948.  P. J. McLAREN ET AL  2,456,522
CONTINUOUSLY ADJUSTABLE SPEED ELECTRIC DRIVE
Original Filed Jan. 28, 1943  7 Sheets-Sheet 1

INVENTORS:
PETER J. McLAREN, DECEASED, by
HARRY E. HANSEN AND
CENTRAL HANOVER BANK & TRUST CO. EXECUTORS
JOHN A. VAUGHAN
BY  MACON FRY their Attorneys Dec. 14, 1948. P. J. McLAREN ET AL 2,456,522
CONTINUOUSLY ADJUSTABLE SPEED ELECTRIC DRIVE
Original Filed Jan. 28, 1943 7 Sheets-Sheet 3

INVENTORS:
PETER J. McLAREN, DECEASED, by
HARRY E. HANSEN AND
CENTRAL HANOVER BANK & TRUST CO. EXECUTORS.
JOHN A. VAUGHAN
MACON FRY
BY
their Attorneys — Electrical
----- Mechanical INVENTORS:
PETER J. McLAREN, DECEASED, by
HARRY E. HANSEN AND
CENTRAL HANOVER BANK & TRUST CO. EXECUTORS
JOHN A. VAUGHAN
MACON FRY
BY
Moses & Nolte
Their Attorneys Dec. 14, 1948.  P. J. McLAREN ET AL  2,456,522
CONTINUOUSLY ADJUSTABLE SPEED ELECTRIC DRIVE
Original Filed Jan. 28, 1943  7 Sheets-Sheet 5

INVENTORS:
PETER J. McLAREN, DECEASED, by
HARRY E. HANSEN AND
CENTRAL HANOVER BANK & TRUST CO. EXECUTORS
BY  JOHN A. VAUGHAN
MACON FRY their Attorneys Dec. 14, 1948.     P. J. McLAREN ET AL     2,456,522
CONTINUOUSLY ADJUSTABLE SPEED ELECTRIC DRIVE
Original Filed Jan. 28, 1943     7 Sheets-Sheet 6

INVENTORS:
PETER J. McLAREN, DECEASED, by
HARRY E. HANSEN AND
CENTRAL HANOVER BANK & TRUST Co. EXECUTORS
JOHN A. VAUGHAN
BY   MACON FRY their Attorneys

Patented Dec. 14, 1948

2,456,522

UNITED STATES PATENT OFFICE

2,456,522

CONTINUOUSLY ADJUSTABLE SPEED ELECTRIC DRIVE

Peter J. McLaren, deceased, late of New York, N. Y., by Central Hanover Bank and Trust Company, executor, New York, N. Y., John A. Vaughan, Hempstead, N. Y., and Macon Fry, Harrington Park, N. J.; said McLaren, Vaughan, and Fry, assignors, by mesne assignments, to The W. L. Maxson Corporation, New York, N. Y., a corporation of New York Continuation of application Serial No. 473,800, January 28, 1943. This application May 18, 1948, Serial No. 27,807

5 Claims. (Cl. 318—257)

This invention relates to driving mechanism, constantly under the control of an operator, for producing at will any desired output speed between positive limits and between negative limits, and more particularly to a combination of a plurality of such reversible, variable speed, driving mechanisms under the influence of a common control member which is operable, independently but simultaneously and coordinately, to vary and control the directions and speeds of outputs of the respective driving mechanisms.

Although the invention is by no means limited in its application to the aiming of guns, it has particular utility in that field and may be most conveniently and advantageously disclosed in connection with gun aiming means.

In the illustrative embodiment of the present invention a gun turret, mounted for rotation, supports one or more guns for rotation in unison with itself and also with capacity for rotation about an axis at right-angles to the turret axis. The gun or guns are thus caused to be operated in azimuth by rotation of the turret and are caused to be operated in elevation by rotation relative to the turret. A control member, displaceable in either of two opposite directions from an azimuth neutral attitude, determine the direction of operation in azimuth by the direction of its displacement, and the speed of operation in azimuth by the extent of such displacement. The same control member is also displaceable in either of two opposite directions from an elevation neutral attitude and determines the direction of operation in elevation by the direction of its displacement, and the speed of operation in elevation by the extent of such displacement. Operations in azimuth and in elevation may be concurrently, independently controlled, and hence the operator has it in his power to effect operation of the gun or guns in any desired direction and at any desired speed within limits.

It is an important object of the present invention to provide azimuth and elevation electric drives in combination with one another and with common control means of the character indicated above.

In a broader aspect, it is a salient object of the invention to provide efficient and dependable driving mechanism for producing with accuracy any selected output speed in either of two opposite directions throughout a wide range of adjustment.

It is a further object to provide an uninterruptedly adjustable, variable speed driving mechanism of the kind referred to, adapted for regulation by a manual or mechanical control member, and of such nature that the output speed may be a definite function of the direction and extent of displacement of the control member from a neutral or datum position. In other words, the output speed is so definitely related to the position of the manual control member that the manual control member can be utilized as an accurate speed indicator and guide, and/or as a means for running a measure of speed into apparatus whose operation requires an accurate measure of the speed for an input.

It is a further object of the invention to provide an electric drive of the kind referred to, thereby eliminating the variables and uncertainties which are inherent in hydraulic drives and in mechanical friction drives, while avoiding such important drawbacks as the fine manufacturing requirements of the former, and the excessive wear of the latter.

It is a further object of the invention to provide an electric drive in which speed responsive means, driven by a motor, is operative upon a driving circuit or circuits of the motor constructed and arranged to cause the output speed to be reduced when the output speed exceeds the speed characteristic of the position of the control member, and to cause the output speed to be increased when the output speed has been reduced below the speed characteristic of the position of the control member.

It is a further object of the invention to provide, in combination with an electric motor, make and break mechanism responsive to the speed of the motor and settable by a control member to interrupt and reestablish field current supply at any selected speed within the positive and negative operative ranges, together with means automatically adjustable in response to operation of the control member to limit current flow through the armature to safe values under all operating conditions.

Important features of the invention have to do with means for making practical and effective direct current electric drives of the kind referred to, and means for making practical and effective alternating current drives of the kind referred to.

Advantages of the present invention reside in the fact that the control has virtually no load lag, and is inherently stable. Further advantage is present in that the controlling elements of the regulator may be placed at a point remote from the controlled elements.

The present application is a continuation of the pending application of Peter J. McLaren, John A. Vaughan and Macon Fry, Serial No. 473,800 filed January 28, 1943, now abandoned.

Other objects and advantages will hereinafter appear.

In the drawing forming part of this specification

Figure 4:
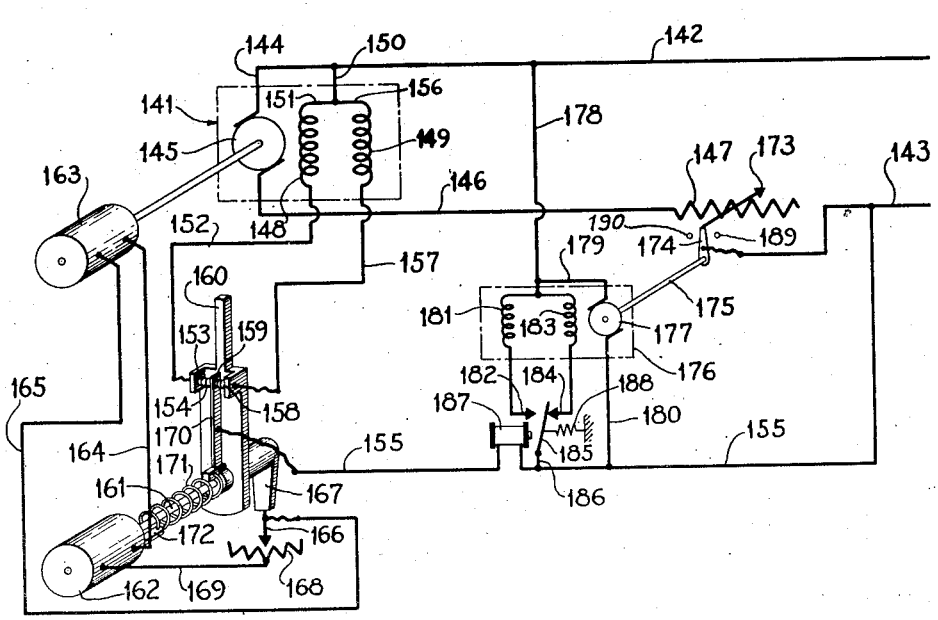
Fig. 4 is a diagrammatic view illustrating a second form of electric drive adapted for D. C. operation.
Figure 6:
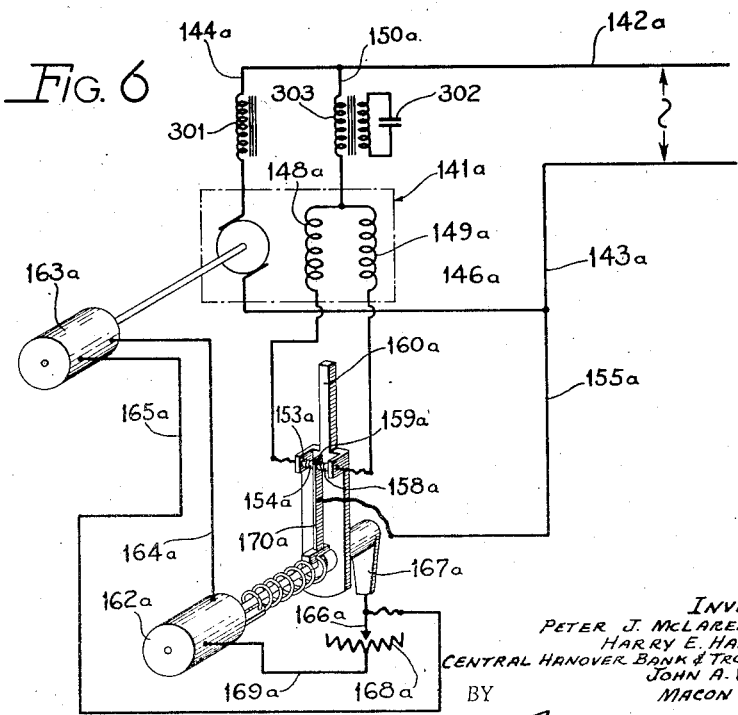
Fig. 6 is a diagrammatic view illustrating a fourth form of electric drive adapted for A. C. operation.
Figure 7:
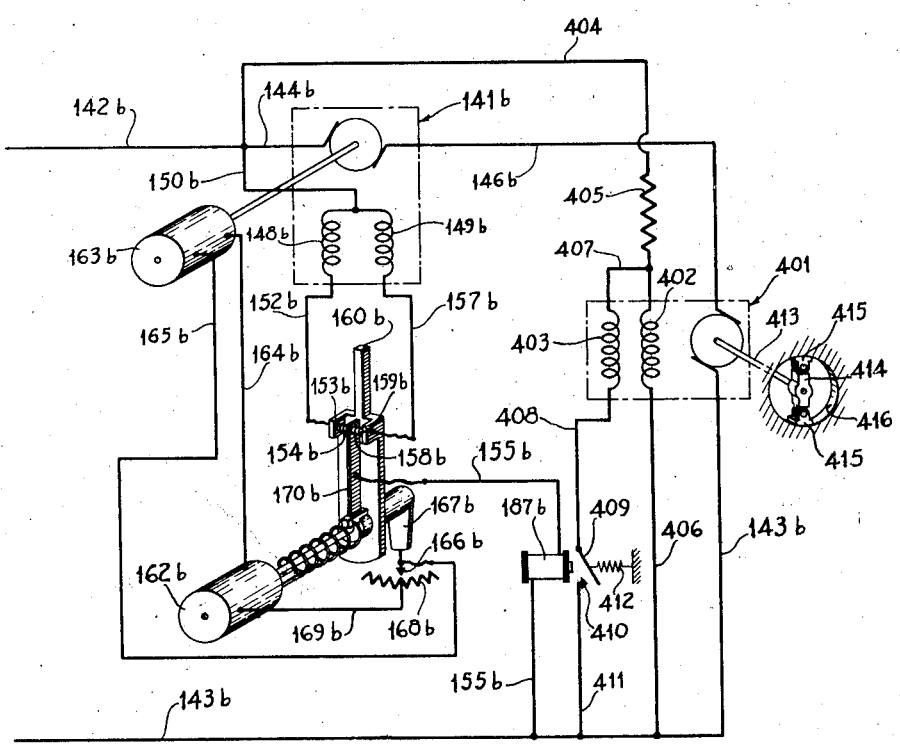
Figure 8:
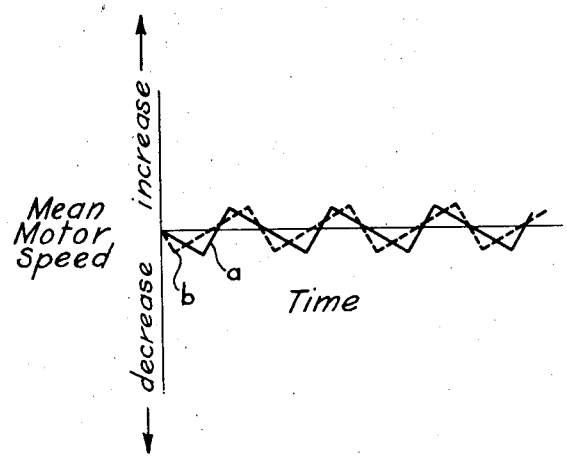
Figure 9:
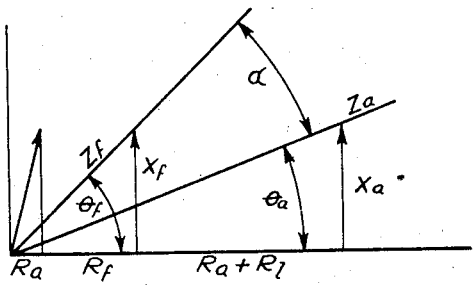
Figure 10:
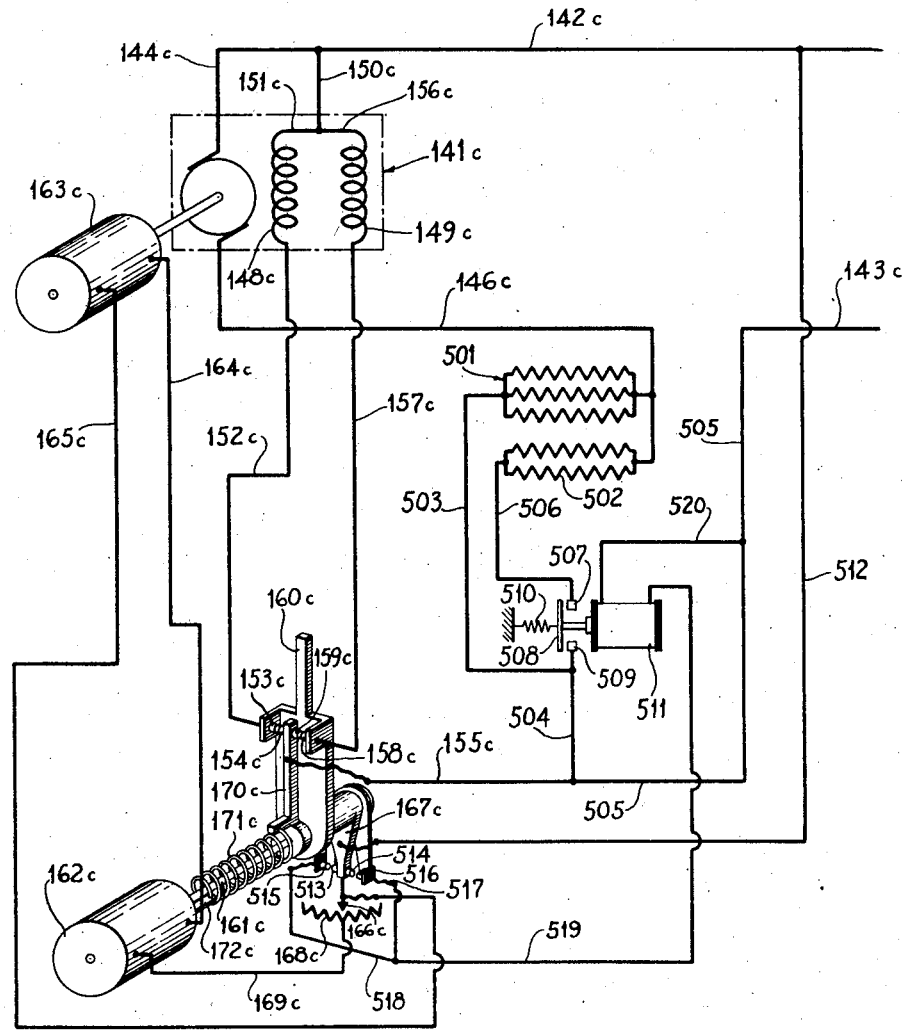

Fig. 7 is a diagrammatic view illustrating a further form of electric drive adapted for A. C. or D. C. operation;

Fig. 8 is a graph illustrating certain operating characteristics of the electric drive of Fig. 4;

Fig. 9 is a vector diagram illustrating and explaining principles and relationships applicable to Fig. 6; and Fig. 10 is a diagrammatic view illustrating a further form of electric drive adapted for D. C. operation.

Figure 1:
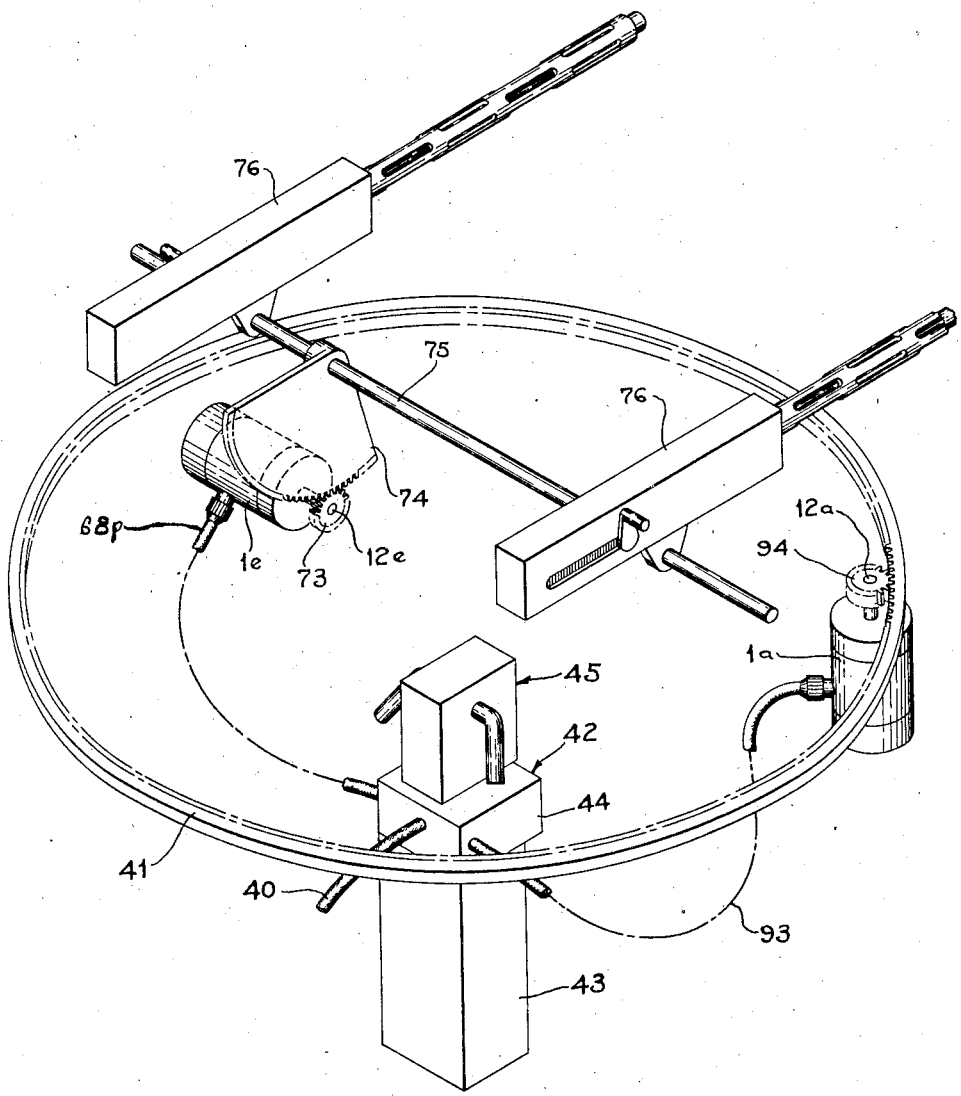
Fig. 1 is a fragmentary perspective view of a turret and gun assembly in which the invention is embodied.
Figure 2:
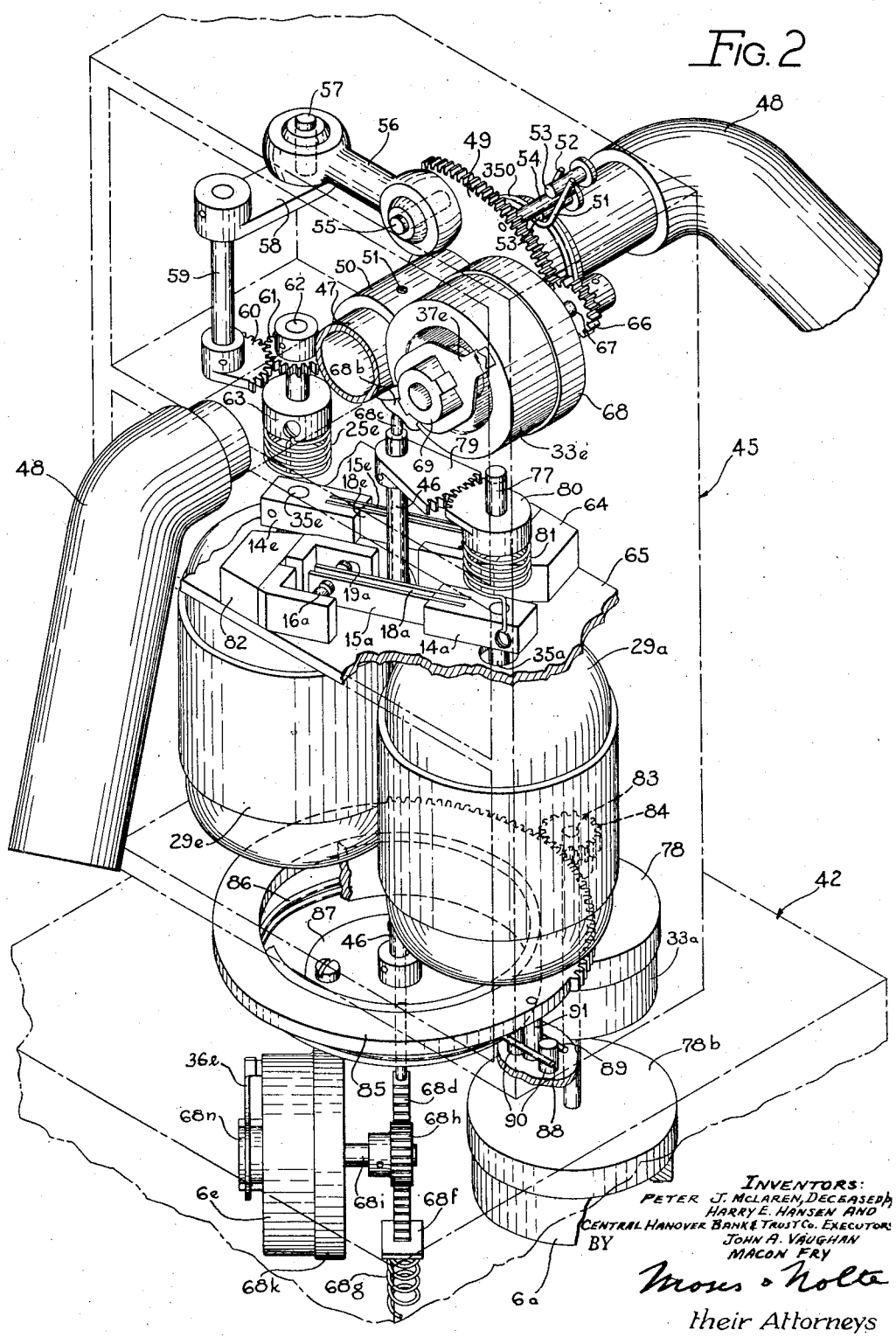
Fig. 2 is a fragmentary perspective view illustrating important elements of the control mechanism of Fig. 1.
Figure 3:
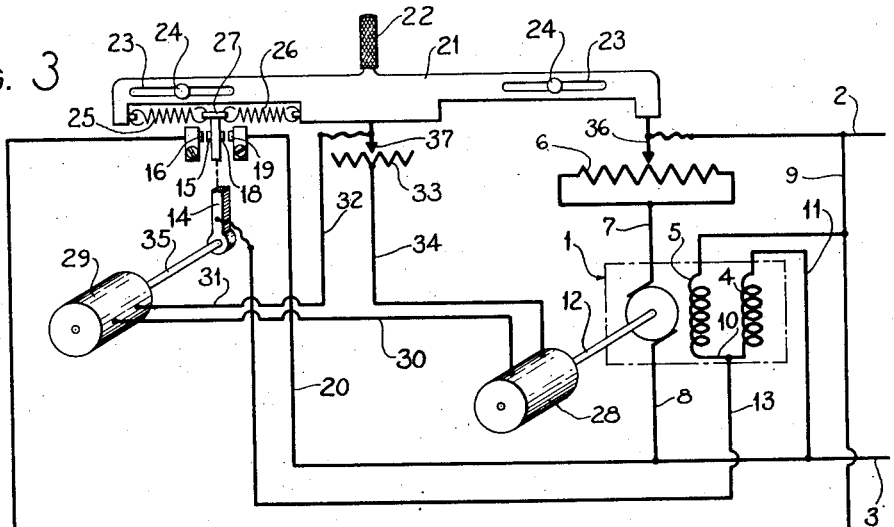
Fig. 3 is a diagrammatic view illustrating control circuits of a single one of the electric drive units as employed in the apparatus of Figs. 1 and 2, the electric drive being organized for direct current operation.

In the embodiment of the invention disclosed in Figs. 1 to 3, each of the drives, azimuth and elevation, comprises a direct current motor 1 as diagrammatically shown in Fig. 3. The motor is shown as energized from a D. C. source through line conductors 2 and 3. The motor is of the double shunt type, having opposed field windings 4 and 5. Current is supplied to the motor armature from line conductor 2 through a closed ring resister 6, which will be referred to in greater detail hereinafter, and a conductor 7, and is returned to line conductor 3 through a conductor 8. A suitable line switch (not shown) may be provided, and whenever the line switch is closed current may flow from line conductor 2 through a conductor 9, field winding 5, conductor 10, field winding 4 and conductor 11 to line conductor 3.

As the parts are illustrated in Fig. 1, the line switch may be assumed to be closed, so that current flows through the armature winding, and through the opposed field windings in the path described. The two field windings balance one another so that no rotation of the armature and the motor shaft 12 results. The motor elements are heated by the flow of current, however, so that their operating characteristics will not be substantially altered by change of temperature when the motor is set into operation. In the neutral condition, as illustrated in Fig. 3, the ring resistor 6 interposes a high resistance in series with the armature and protects the motor against damaging overload.

The motor is set into operation in one direction or the other by short circuiting one or the other of the field windings 4 and 5, and provision is made of speed responsive mechanism operated by the motor for interrupting the short circuit at any selected speed in either direction.

For this purpose a conductor 13 runs from conductor 10 to a contact arm 14. The arm 14 includes a contact 15 which is adapted to be moved into engagement with a stationary contact 16 and thus, through a conductor 17 connected to the contact 16 and to the conductor 9, to complete a short circuit path around the winding 5. The contact arm 14 also includes a contact 18 which is adapted to be moved into engagement with a contact 19 and thus, through a conductor 20 which is connected to the contact 19 and to the conductor 11, to complete a short circuit path around the field winding 4.

The short circuit paths are closed alternatively. When the winding 4 is short circuited the winding 5 is effective to produce rotation of the motor shaft 12 in one direction, and when the winding 5 is short circuited the winding 4 is effective to produce rotation of the motor shaft 12 in the other direction.

The contact arm 14 is manually operable by a control slide 21 having a control handle 22. The slide 21 in the purely diagrammatic illustration of Fig. 3 is shown as formed with slots 23 and is slidably mounted upon stationary headed studs 24. In the actual physical structure illustrated in Fig. 2 the members corresponding to the slide 21 are rotary members and there are other minor physical differences, but the principle of operation is that illustrated in Fig. 3. Motion of the slide 21 is yieldingly transmitted to the contact arm 14 through opposed tension springs 25 and 26. The spring 25 is anchored at its left-hand end to the slide 21 and at its right-hand end to a head member 27 of the contact arm 14. The spring 26 is anchored at its left-hand end to the head member 27 of the contact arm 14 and at its right-hand end to the slide 21.

When the slide 21 is moved toward the left from the neutral position illustrated in Fig. 1, the arm 14 is carried toward the left until arrested by engagement with the contact 16. Further movement of the slide 21 toward the left places the spring 25 under progressively increasing tension. Similarly, when the slide is moved toward the right from the neutral position of Fig. 1, the contact arm 14 is moved toward the right until arrested by engagement of contact 18 with contact 19. Further movement of the slide 21 toward the right places the spring 26 under progressively increasing tension. In either case the movable contact is held yieldingly against the stationary contact with a force whose magnitude depends upon the position to which the slide 21 has been moved.

As soon as contact 15 is closed onto contact 16 by movement of the slide toward the left, the winding 5 is shorted out and the winding 4 becomes fully effective to drive the motor shaft in a definite direction. Similarly, as soon as the contact 18 is closed on contact 19 the winding 4 is shorted out and the winding 5 becomes fully effective to drive the motor shaft in the opposite direction.

Provision is made in either case for limiting the speed of the motor to a speed characteristic of the position to which the slide has been moved by the handle 22. It is characteristic of a properly designed motor generator to produce a voltage output which bears a definite relationship to the speed of the motor. If, therefore, the motor is caused to drive a generator, and a device capable of accurately responding to the generated voltage is utilized to regulate a control, the system may be employed to govern the speed of the power motor driving the generator.

A direct current generator 28, driven by the motor 1, is connected to a galvanometer 29. The circuit is established through conductors 30, 31, 32, a slide contact 37 carried by the slide bar 21, a resistor 33 and a conductor 34. The resistor 33 will be explained in further detail hereinafter. The contact arm 14 is fixed on shaft 35 of galvanometer 29, and hence has applied to it a torque depending for its direction upon the direction of rotation of the motor generator, and for its magnitude upon the voltage generated by the generator. This galvanometer torque is applied in the direction to move contact 15 away from contact 16 against the tension of spring 25 when rotation of the motor has been brought about by closing of the contact 15 on the contact 16, and is in the direction to move contact 18 away from contact 19 against the tension of the spring 26 when the operation of the motor has been brought about by closing of the contact 18 on the contact 19.

Since the principle of operation is the same in either case an explanation for one case will suffice for both.

When the control handle 22 has been moved to the right, closing contact 18 upon contact 19, and then putting a further predetermined tension upon the spring 26 according to the distance that the slide is moved to the right, engagement of the contacts 18 and 19 will be maintained until the motor has attained a speed characteristic of the position in which the handle 22 is held. As the motor gains speed an increasing counter-clockwise torque is applied to the contact arm 14, and when this torque is sufficient to overcome the tension of spring 26, the arm 14 is moved to the left to break engagement of the contact 18 with the contact 19. This brings about an immediate slowing down of the motor 1. The slowing down of the motor reduces the voltage generated by generator 28 and reduces the torque applied by galvanometer 29 to arm 14, so that the torque is no longer able to overcome the tension of the spring 26 and the spring returns the contact 18 to engagement with contact 19, thereby again increasing the speed of the motor. Engagement is broken and reestablished in rapid alternation, the departures from the desired average speed being very slight.

When the line switch is closed and the motor is not running, the current flow through the armature is limited only by the resistance of the conductive path through the armature, including the ring resistor 6, and hence the resistor 6 is constructed and arranged to interpose a high resistance in the neutral condition of the parts. As the motor acquires speed in either direction, however, a counter E. M. F. is developed and the effective resistance of resistor 6 can be, and is, reduced, without liability of destructive current flow through the armature, and with the advantage that more output power can be developed with the same motor and with the same expenditure of energy than would be available if the resistance of resistor 6 remained constant at its maximum or neutral value.

It is important, of course, that the resistance value of resistor 6 for any selected motor speed setting be so chosen that the motor shall be capable under full load of developing a speed in excess of that to which it is limited by the corresponding setting of the speed responsive means. The proper design for meeting this requirement can be readily ascertained from the factors affecting the motor characteristics and those affecting the speed responsive means. The motor speed formula is $$n = \frac{V - I_a R_a}{K\phi} = \frac{E_a}{K\phi} \qquad (1)$$

where $n$ is motor speed in revolutions per second, $V$ is the voltage between the supply mains, $R_a$ is the resistance of the armature circuit, $I_a$ is the current flowing through the armature, $\phi$ is the armature flux, $K$ is a constant, and $E_a$ is the counter-electromotive force.

The lesser speed $n'$ at which the speed responsive mechanism acts for any given setting of the handle 22 to interrupt acceleration of the motor toward the speed $n$ depends upon the torque applied by the spring 25, 26 at that setting being overcome by the opposing torque developed by the galvanometer when the motor has attained the speed $n'$. The torque applied by the spring 25, 26 for a given setting of the slide 22 depends upon the length and stiffness of the spring, and may therefore be predetermined by proper selection of the spring. The stress of the spring employed is a linear function of the displacement of the handle 22 from the neutral position. The opposing torque developed by the galvanometer at speed $n'$ depends upon the galvanometer characteristics, the generator characteristics, and the value of any resistance which may be interposed in the generator-galvanometer circuit.

By utilizing a variable resistance 33 in the generator-galvanometer circuit and controlling 33 from the handle 22, the galvanometer torque may be made to bear a non-linear relation to the speed of the motor-generator, and thereby to bring about a non-linear relation between the displacement of the handle 22 and the resulting increment of the speed $n'$ at which the speed responsive means will cause the arm 14 to break contact. This is desirable in order that a finer and more sensitive speed control may be realized in the low speed range than in the higher speed range. The non-linear relationship can be accentuated, or adjusted as desired, by making the resistance 33, itself, non-linear in its response to movement of the handle 22. The resistance 33, for example, may be a winding made up of short turns at the middle and progressively longer turns toward the ends, so that the slide contact 37, as it moves outward from the neutral position, cuts in a greater increment of resistance for each uniform increment of movement. Whatever law of variation is selected for displacement of the handle to one side of the neutral position will desirably be selected also for displacement of the handle to the other side of the neutral position.

Since movement of the handle away from neutral to any setting tends to accelerate the motor at least to a speed $n$ characteristic of the motor for that setting under full load conditions, which is greater than the speed $n'$ for which the speed responsive mechanism is correspondingly set by the same movement of the handle, the circuit breaking operation of arm 14 at speed $n'$ by the speed responsive means always acts to interrupt motor circuit conditions which are acting to produce acceleration, and to reestablish the original balanced or neutral circuit conditions which tend to produce and maintain a state of rest. The motor, therefore, is caused to slow down to the slight extent necessary to reestablish the drive, and thus the motor speed is held to the desired average speed $n'$ with very slight and very rapid fluctuations above and below that speed.

If for any reason the motor should tend to speed up when it should slow down after a circuit breaking operation of arm 14, arm 14 will be quickly moved over to close the opposite pair of contacts and will be caused thereby to establish momentarily the reverse driving condition, thus assuring a prompt slowing down. This is true in all the forms of the invention illustrated herein.

In providing for a reduction in value of the effective resistance of the resistor 6 as the control handle 22 is moved in a direction to increase the speed setting $n'$ of the speed responsive means, it is important that the resistance be maintained nevertheless at such value for each speed $n'$ that no destructive increase of current flow through the armature shall occur.

We have found that if, for each speed setting $n'$ of the speed responsive means, the resistor 6 is adjusted to a resistance value such that $I_a R_a$ will be at least equal at that speed to the constant value $V/2$, the required limitation of current may be effected in a safe and entirely satisfactory manner. Expressed otherwise, $E_a$ can never be greater than $V/2$ at the motor speed for which the speed responsive means is set.

A slide contact 36 connected to the conductor 2 and carried by the slide 21 engages the ring resistor 6 and is shifted relative to the resistor by and with the slide 21. As shown in Fig. 1 the parts are in neutral and the slide 36 engages the center point of the resistor 6. This provides equal parallel paths to the conductor 7, and interposes the maximum resistance between the conductor 2 and the conductor 7. When the slide contact 36 is moved toward the right from the center position the resistance is progressively diminished, and when the slide contact 36 is moved toward the left from the center position the resistance is also progressively diminished.

The resistor 6 is desirably non-linear in its construction. It may, for example, take the form of a winding having relatively long turns at the middle and progressively shorter turns outward from the middle.

Two driving units like that diagrammatically illustrated in Fig. 3 are employed in the mechanism of Figs. 1 and 2, one for driving a turret about a vertical axis, and the other for driving a gun support about a horizontal axis which is fixed relative to the turret. The rotation of the turret operates the guns in azimuth, while rotation of a horizontal shaft upon which the guns are mounted operates the guns in elevation. All of the mechanism illustrated in Figs. 1 and 2, with the exception of a stationary internal gear 41, is mounted upon the turret and participates in the movement of the turret about the vertical axis thereof. A stationary casing 42 comprising lower and upper casing members 43 and 44 is affixed to the turret and supports a control box 45.

The control box 45 is mounted on the casing 42 for rotary movement about the axis of a stationary vertical shaft 46. A sleeve 47 extends through the opposite side walls of the control box 45, being mounted in the walls with capacity for rocking movement about a horizontal axis. Handle members 48 are affixed to the opposite protruding ends of the sleeve 47. The sleeve 47 together with the handles 48 constitute a common control member for both the azimuth and elevation drives.

A gear segment 49 within the box 45 has a hub portion 50 thereof affixed, as by means of a set screw 51, to the sleeve 47. Control of the elevation drive is effected through rotation of the gear segment 49 in unison with the sleeve 47.

As illustrated, the parts are in the elevation neutral position, being biased toward and yieldingly retained in this position by means of a coil spring 350. As best seen in Fig. 2, the spring 350 extends around a hub portion of the segment 49 within the box 45, and has its opposite ends turned upward to form arms 51 and 52 which lie normally at opposite sides of a pair of fixed pins 53. The pins 53 are mounted on a side wall of the box 45 to extend inward from said wall. A pin 54 carried by the gear segment 49 extends outward between the arms 51 and 52.

Clockwise rotation of the sleeve 47 from the position illustrated in Fig. 2 causes the pin 54 to push the arm 51 around in a clockwise direction while corresponding movement of the arm 52 is prevented by the pins 53. Such movement, therefore, causes contraction of the spring 50 and places it under a progressively increased stress, so that the spring tends through the arm 51 to return the sleeve 47 and the control handles 48 to the initial position as illustrated. Similarly, when the control member is operated in a counter-clockwise direction away from neutral, the arm 52 is moved in a counter-clockwise direction while the arm 51 is restrained by the pins 53. The spring, acting through the arm 52, tends therefore to return the parts in a clockwise direction to the condition illustrated in Fig. 2. The spring may be constructed and arranged to be under any predetermined stress when the parts are in neutral position, and hence may be caused to exert any neutralizing force desired.

The gear segment 49 is connected through a pin 55, carried by the gear segment, and a link 56, to a pin 57 carried by crank 58 fast on vertical shaft 59. The shaft 59 has affixed to it a gear segment 60 which meshes with a pinion 61 fast on a vertical shaft 62. A collar 63 on the shaft 62 is connected through a coil spring 25e with a contact arm 14e which is fast upon a vertical shaft 35e of a galvanometer 29e. Contact blades 15e and 18e carried by the block 14e extend between the arms of a stationary contact carrying block 64. The block 64 is fixed upon a horizontal partition wall 65 of the box 45. The block 64 carries a pair of contacts corresponding to the contacts 16 and 19 of Fig. 3.

The spring 25e is under no initial stress. When the shaft 62 is turned away from neutral in either direction, the block 14e and the shaft 35e turn in unison with it until arrested by one or the other of the contacts carried by the block 64, depending upon the direction of rotation. In one direction continued rotation of the shaft 62 after the block 14e has been arrested puts the spring 25e under stress by forcing the spring to expand, while in the opposite direction continued rotation of the shaft 62 after the block 14e has been arrested puts the spring under stress by forcing the spring to contract. The spring 25e, therefore, serves the combined function of the springs 25 and 26 diagrammatically illustrated as the equivalent of spring 25e, in Fig. 3.

The gear segment 49 meshes with a pinion 66 which is fast upon a horizontal shaft 67. The shaft 67 extends through a stationary casing 68 within which there is supported a resistor 33e corresponding to the resistor 33 of Fig. 3. A hub 69 of insulating material is affixed to the shaft 67 and has a wiper arm keyed to it for cooperating with the resistor element 33e.

The sleeve 47 of the control member has fast upon it a cam 68b for engaging and thrusting downward a thrust rod 68c which passes through the stationary hollow shaft 46 and down into the stationary casing 42. A rack 68d affixed to the lower end of the rod 68c is provided at its lower end with a cap 68f which bears against a compression coil spring 68g, the spring serving to thrust the rack and rod upward and maintain the upper end of the rod 68c in engagement with the cam 68b. The rack 68d drives a pinion 68h fast on a shaft 68i. The shaft 68i extends through a stationary casing 68k within which there is supported a resistor 6e corresponding to the resistor 6 of Fig. 3. A hub 68n of insulating material is affixed to the shaft 68k and has a wiper arm 36e keyed to it for cooperating with resistor element 6e. Movement of the control member in either direction from the elevation neutral attitude causes an increase of the resistance included in the generator galvanometer circuit of the elevation drive as explained in connection with Fig. 3.

The electrical connections are not fully illustrated in detail in Figs. 1 and 2, because they have been illustrated and described in Fig. 3, and because their inclusion in Figs. 1 and 2 would tend to obscure the disclosure of the mechanical parts. It will be understood, however, that the wiper arm 37e carried by the shaft 67 corresponds to the slide contact 37 of Fig. 3, that the wiper arm 36e corresponds to slide contact 36 of Fig. 3, and that each part to which a reference numeral of Fig. 3 has been applied with a or e added corresponds to the parts bearing the same numeral in Fig. 3, and is electrically connected in the manner illustrated by Fig. 3. The appropriate conductors for the elevation drive are carried from casing 42 to the elevation motor generator 1e through a conduit 68p.

The output shaft 12e of the motor-generator 1e has affixed to it a pinion 73 which meshes with an elevation segment 74, fast on a horizontal shaft 75. The shaft 75 is mounted for rocking movement in fixed bearings (not shown) of the turret. Two machine guns 76 are affixed to the shaft 75, and are operated in elevation by rocking movements imparted to the shaft. The guns, obviously, are raised by rotation of the motor shaft 12e in one direction and are depressed by rotation of the motor shaft 12e in the opposite direction.

The mechanism for operating the turret about its vertical axis to operate the guns in azimuth is in general similar to that which has been described for operating the guns in elevation.

The control box 45 may be turned about its vertical axis (coincident with the axis of the shaft 46) by operation of the control handles 48. The shaft 46 does not participate in this movement, but is fixedly mounted in the stationary casing 42 to extend up into the control box 45. Rotation of the control box does, however, carry with the control box about the axis of shaft 46 a vertical shaft 77, a galvanometer 29a, and a galvanometer shaft 35a.

Shaft 46 has affixed to it a gear segment 79, which meshes with a gear segment 80 fast on shaft 77. The segment 80 is connected through a coil spring 81 with a contact arm 14a fast on the galvanometer shaft 35a. The arm 14a carries contact blades 15a and 18a which extend between arms of a yoke-like contact carrying block 82. The block 82 is affixed to the partition wall 65 of the control box 45. The block 82 carries contacts 16a and 19a for cooperation, respectively, with contacts carried by the blades 15a and 18a. A vertical shaft 83 carried by the stationary casing 42 has affixed to the upper end thereof a pinion 84 which meshes with a gear 85 affixed to the control box 45. The shaft 83 extends axially through a resistor casing 78, the casing 78 being stationarily mounted in the stationary casing 42. The gear 85 is coaxial with the shaft 46. Rotation of the gear 85 with the control box 45 causes the pinion 84 and the shaft 83 upon which it is mounted to rotate.

The casing 78 includes a resistor 33a corresponding to resistor 33 of Fig. 3, and the shaft 83 has fixed upon it, but insulated from it, a wiper arm like the wiper arm 37e, the function of these parts being the same in the azimuth drive as that of the corresponding parts in the elevation drive. The shaft 83 also extends through a casing 78b which includes a resistor 6a, and the shaft 83 has fixed upon it, but insulated from it, a wiper arm like the wiper arm 37a, the function of these parts being that described in connection with the parts 37 and 33 of Fig. 3.

As in the case of the segment 49, provision is made of means tending to restore and to maintain the control box 45 in its neutral position. A coil spring 86 surrounds a flange on gear 85. The ends of the spring 86 are turned outward to form arms 88 and 89 which lie at opposite sides of a pair of pins 90, the pins being affixed to the casing 42 and extending upwardly therefrom. A pin 91 affixed to the gear 85 extends downwardly from the gear between the arms 88 and 89. The pin 91 carries one or the other of the arms 88, 89 around in front of it as the control box is rotated away from neutral while the other of the arms 88, 89 is restrained from following through engagement with the stationary pins 90. The operation is exactly the same in principle as that described for the corresponding mechanism in connection with the gear segment 49.

The appropriate conductors for the azimuth drive are carried from casing 42 to the azimuth motor-generator 1a through a conduit 93. The motor-generator 1a is mounted upon and affixed to the turret. The output shaft 12a of the motor-generator 1a has affixed to it a pinion 94 which meshes with the internal teeth of the stationary ring gear 41. Operation of the motor-generator shaft is effective, therefore, to drive the turret about its vertical axis in one direction or the other relative to the stationary ring gear 41, the direction of rotation depending upon the direction in which the motor shaft 12a is driven.

In the form of the invention diagrammatically disclosed in Fig. 4, a double shunt D. C. motor 141 is connected through line conductors 142 and 143 with a source of direct current. The current flows from conductor 142 through a conductor 144 to the armature 145 of the motor and returns thence through a conductor 146 and a variable resistance 147 to conductor 143. Current may also flow through either of two opposed field windings 148 and 149 which are connected in parallel with one another. One path is from 142 through conductors 150 and 151, winding 148, conductor 152, contacts 153 and 154, and a return conductor 155 to conductor 143. The other path is from 142 through conductors 150 and 156, winding 149, conductor 157, contacts 158 and 159, and return conductor 155 to conductor 143. The field circuits described are normally open, and are closed alternatively to cause the motor to be driven selectively in one direction or the other.

The contacts 153 and 158 are carried on a manual control member 160, which is mounted for pivotal movement coaxially with the shaft 161 of a galvanometer 162. The motor 141 drives a D. C. generator 163 which is connected to the galvanometer 162 through a conductor 164, on the one hand, and through a conductor 165, a slide contact 166 carried by an arm 167 of control member 160, a center connected resistor 168, like resistor 33 of Fig. 3, and a conductor 169, on the other hand.

The contacts 154 and 159 are mounted on an arm 170 which is fast on the galvanometer shaft 161. A coil spring 171 which surrounds the galvanometer shaft 161 and which is connected at one end to the arm 170 and at the other to a stationary pin 172 tends to maintain the arm 170 in the normal or neutral position illustrated in Fig. 4 when no electrical potential is applied to the galvanometer.

In the normal or neutral position, neither of the windings 148 and 149 is energized, and the motor remains idle. When the manual control member 160 is swung counter-clockwise, contact 158 is first carried into engagement with contact 159, and further counter-clockwise movement of the control member 160 swings the arm 170 in a counter-clockwise direction against a progressively increasing stress of the spring 171. When the control member 160 is moved from neutral in a clockwise direction, contact 153 is first carried into engagement with contact 154, and further movement of the control member in a clockwise direction moves the arm 170 in a clockwise direction against a progressively increasing stress of the spring 171.

The immediate effect of engagement of contacts 158 and 159 is to set the motor into operation in one direction, while the immediate effect of engagement of the contacts 153 and 154 is to set the motor into operation in the opposite direction. In the former case the tendency of the stress of spring 171 is to press contact 159 clockwise against contact 158, but the tendency of the generated voltage is to apply a counter-clockwise torque to arm 170 which tends to separate the contacts. When the electrically developed torque is sufficient to overcome the spring torque, contact 159 is moved out of engagement with contact 158 and the motor immediately begins to lose speed. This causes the generated voltage to drop and enables the spring 171 to restore engagement of contacts 159 and 158, so that the motor immediately starts to gain speed again. Since the stress of the spring depends upon the position to which the control member 160 has been moved, there will be a definite motor speed corresponding to any selected position of the manual control member 160. When the manual control member is moved counter-clockwise to engage contacts 153 and 154, the operation is precisely the same in principle as that which has just been described, the only difference being that operation of the motor is in the opposite direction.

A ballast resistance 147 is provided in circuit with the armature 145 which is automatically and progressively varied in accordance with load conditions, to provide a relatively high resistance in series with the armature under no-load conditions and a relatively low resistance in series with the armature under full load conditions.

Connection between the resistance 147 and line conductor 143 is effected through a slide contact 173 which is mounted on an arm 174 carried by shaft 175 of a reversible servo-motor 176. The servo-motor 176 is a double shunt D. C. motor. The armature 177 of motor 176 is connected to conductor 142 through conductors 178 and 179, and to conductor 143 through conductors 180 and 155. Conductor 178 is connected through one field winding 181 with a contact 182, and through the other field winding 183 with a contact 184. A switch 185 connected through a conductor 186 to conductor 155 is adapted to engage either contact 182 or contact 184, so that the motor 176 may be connected to drive the arm 174 in one direction or the other. The conductor 155 has interposed in it a relay 187. When the relay 187 is energized it draws the switch 185 toward the left into engagement with contact 182. When the relay 187 is not energized, a spring 188 draws the switch 185 to the right and into engagement with contact 184.

The relay 187 is designed to overcome the tension of the spring 188 only when appreciable current flows.

Fig. 8 shows the speed-time curves of the power motor, curve $a$ indicating power motor speed at substantially no load condition and curve $b$ power motor speed at full load condition. It will be noted, by comparing the curves, that both curves are of saw tooth shape and of equal amplitude, but that the periods of acceleration under no-load conditions are relatively shorter than the periods of acceleration under load conditions, and further, that the periods of deceleration at no-load condition are relatively longer than the periods of deceleration under load. In effect, the speed-time curve contour is determined by power motor load condition.

When the power motor is first set into operation, the effective resistance of 147 may be of maximum value, but switch 185 immediately closes on contact 182 and causes the resistance of 147 to be continuously reduced until the speed has been attained for which control member 160 has been set. Then, when the effective field circuit of motor 141 is opened, switch 185 leaves 182 and engages 184, causing the resistance of 147 to be increased. So long as the setting of 160 remains unchanged, the switch 185 oscillates to engage 184 and 182 in alternation, according to whether the circuit of the effective field winding of 141 is open or closed.

Under no-load conditions as shown in Fig 8, the contact arm 185 is held against contact 182 by the relay 187 approximately one-third as long as it is held against contact 184 by the spring 188. This causes the effective resistance of 147 to be progressively increased, and as the resistance is increased, the periods of increase and decrease gradually tend to become equalized. Under no-load conditions, however, equalization is not attained, and the effective resistance of 147 is progressively increased until a maximum value for resistance 147 is reached, whereupon the arm 174 contacts a mechanical stop 189. No injury will result to the servo-motor, since it is designed to operate in a stalled condition.

Under maximum load conditions, the servo-motor operates as described above, but the cumulative operations act to step down the resistance. Again the periods of increase and decrease gradually tend to become equalized in response to the progressive adjustment of the effective resistance of 147, but equalization is not attained, and the effective resistance is adjusted to a predetermined minimum value, whereupon the arm 174 is again arrested by engagement with a stop 190.

At intermediate constant loads the servo-motor operates to adjust the resistance value until the speed-time curve becomes symmetrical, whereupon the servo-motor remains in equilibrium; i. e., produces no net increase or decrease of resistance. It should be noted that the described operations occur at a frequency high enough to insure smooth and stable operation of the system.

The described electric drive of Fig. 4 may be employed in the azimuth drive and in the elevation drive of Figs 1 and 2, and the two drives may be operated by the common control means described in Figs 1 and 2.

Figure 5:
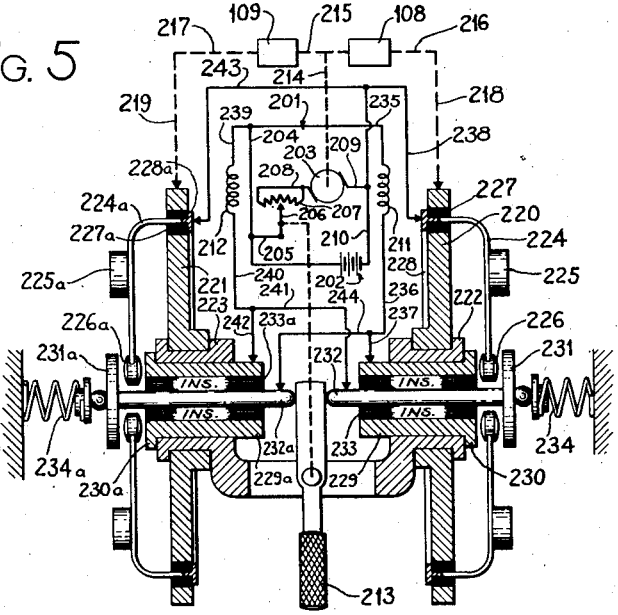
Fig. 5 is a sectional view, largely diagrammatic, of a third form of electric drive adapted for D. C. operation.

In the form of the invention disclosed in Fig. 5, centrifugal means, instead of the generator-galvanometer combination of Figs. 3 and 4, are utilized. A double shunt D. C. motor 201 is employed. A D. C. source, as battery 202, is connected to the motor armature 203 through conductors 204 and 205, a wiping contact 206, a ring resistor 207, and a conductor 208. The return path from the armature 203 to the battery 202 is through conductors 209 and 210. Opposed field windings 211 and 212 are adapted to be connected alternatively to the current source 202.

Provision is made of means for yieldingly closing the circuits of the field windings 211 and 212 to produce rotation of the motor armature and shaft in one direction or the other as desired. Speed responsive means including fly-weight governors are provided for interrupting the effective circuit when a predetermined speed has been attained, characteristic of the position to which a manual control member 213 has been moved. The control member 213 operates the contact 206 in unison with itself.

The motor output shaft 214 drives a shaft 215 which, through one-way clutches 108 and 109, drive trains 216 and 217, respectively, the trains 218 and 219 being connected to drive wheels 220 and 221 which are mounted on stationary bearings 222 and 223. When the shaft 214 turns in one direction, it drives the train 218 and the wheel 220 at a speed proportional to its own speed, but the train 219 and the wheel 221 remain idle. When the shaft 214 is driven in the opposite direction, it drives the train 219 and the wheel 221 at a speed proportional to its own speed, but the train 218 and the wheel 220 remain idle.

The wheel 220 carries a plurality of bent conductive spring arms 224. Each arm has affixed to it intermediate its ends a fly-weight 225 and carries at its inner end a contact member 226. The arms 224 are mounted in insulated bushings 227 and are connected electrically to a ring conductor 228 which is mounted upon, but insulated from, the wheel 220.

A conductive sleeve 229 formed with an end flange 230 is mounted in a bore of the bearing member 222 with the flange member 230 disposed at the outer or righthand side of the bearing member 222. A conductive disc 231 having a conductive stem 232 is mounted by means of an insulating sleeve 233 in fixed relation to the sleeve 229. The flange 230 and the disc 231 stand at opposite sidese of the contact members 226, and are spaced from the contact members in the neutral condition of the parts as illustrated in Fig. 5.

The parts 224 to 233, inclusive, described in conection with the wheel 220 are duplicated in connection with the wheel 221. Corresponding reference numerals have accordingly been applied to the corresponding parts with the subscript "a" added in each instance, and the detailed description of them will not be repeated.

Springs 234 and 234a bear, respectively, against the discs 231 and 231a, the former spring urging the stem 232 toward the left, and the latter urging the stem 232a toward the right. These stems bear against the manual control member 213 and the stresses of the two springs are balanced against one another through the manual control member in the normal or neutral position of the latter.

When the manual control member is swung in a clockwise direction away from the neutral position illustrated in Fig. 5, the stem 232 and the sleeves 233 and 229 are moved as a unit toward the right. The flange 230 first engages the contacts 226 and then moves them toward the right, putting the spring arms 224 under stress.

Engagement of the flange 230 with the contacts 226 closes the circuit of field winding 211. This path includes the conductor 204, a conductor 235, field winding 211, conductors 236 and 237, sleeve 229, flange 230, contacts 226, arms 224, ring conductor 228, and conductors 238 and 210. This causes the motor shaft 214 to be driven through the action of field winding 211 in the direction to drive wheel 220.

The motor gains speed until the centrifugal forces exerted by the fly-weights 225 is sufficient to carry the contacts 226 outward away from engagement with the flange 230 to open the circuit of field winding 211. The motor shaft 214 and the wheel 220 thereupon lose speed until the stress exerted upon the arms 224 by the fly-weights 225 is not greater than the stress imposed upon the arms 224 by the displacement of the sleeve 229 from its normal position. As soon as this occurs the contacts 226 reengage the flange 230 and the circuit for the field winding 211 is again established.

For the reason pointed out in connection with Fig. 4, the armature circuit of the motor is desirably made to include a ring resistor 207 of suitable characteristics to assure slowing down of the motor as soon as engagement between the contacts 226 and the flange 230 is broken and to assure speeding up of the motor as soon as such engagement is reestablished.

Should the conditions be such that the motor does instantaneously speed up, however, at the breaking of contact, the contacts 226 will be carried not merely away from flange 230 but into engagement with the disc 231 and will thereby establish a circuit through the field winding 212 to assure an immediate slowing down of the motor. This circuit is through the conductor 204, a conductor 239, the winding 212, conductors 240 and 241, stem 232, disc 231, contacts 226, arms 224, ring conductor 228, and conductors 238 and 210.

The speed at which the motor operates depends upon the position to which the control member 213 has been moved, since the initial stress of the spring arms 224 which must be exceeded in order to move the contacts 226 out of engagement with the flange 231 is determined by the position of the control member 213. In operation, the making and breaking of engagement between contacts 226 and flange 231 occurs with such rapidity that a substantially constant speed of the motor results.

When the control member 213 is displaced counter-clockwise from the neutral position, the normal circuit of field winding 212 is closed through a path which includes conductors 204 and 239, winding 212, conductors 240 and 242, sleeve 229a, contacts 226a, arms 224a, ring conductor 228a, and conductors 243 and 210. This causes the motor shaft 214 to be turned in the direction opposite to that previously described, and causes the wheel 221 to be driven. The operation with reference to the wheel 221 and the parts associated therewith is in all respects the same as that described for the wheel 220 and the parts associated with the latter for the opposite direction of rotation. Should the contacts 226a engage the disc 231a, field winding 211 will be momentarily energized through a circuit which includes conductors 204 and 235, winding 211, conductors 236 and 244, stem 232a, disc 231a, contacts 226a, arms 224a, ring conductor 228a, and conductors 243 and 210.

The described drive may be used in the azimuth and elevation drives of Figs. 1 and 2.

The principles of the invention may be practically and advantageously applied to an alternating current electric drive as well as to a direct current electric drive. In Fig. 6 disclosure is made of a practical and advantageous embodiment of the invention adapted to be operated from a suitable A. C. source. The embodiment chosen for illustration is generally similar to the embodiment of Fig. 4. The same reference characters applied in Fig. 4 have, therefore, been applied to corresponding parts in Fig. 6 with the subscript "a" added in each instance, and the description will be confined substantially to those parts which are necessarily different in Fig. 6 from Fig. 4 and to those parts which are added.

The motor 141a is supplied with alternating current from a suitable alternating current source through line conductors 142a and 143a. In the main, however, the motor 141a may be connected and controlled in the same manner as the motor 141. Since the generator 163a and the galvanometer 162a have no electrical connections save to one another, the generator 163a may be a D. C. generator, the same as the generator 163, and the galvanometer 162a may be the same as the galvanometer 162.

In the development of conventional A. C. motors in order to secure a high power factor and in the interest of economical operation and design, armature reactance ($X_a$ in the vector diagram of Fig. 8) is kept to a minimum. These motors, however, are never required to run under open field conditions, and consequently no dangerously high current surge through the armature can occur.

When used with a control system of the type described, however, in which opening of the field circuits is a prime factor in securing speed regulation, it is imperative that current flow in the armature be restricted to safe limits in the armature, and, therefore, provisions for compensation corresponding to the series armature resistance of the D. C. motor must also be used with the A. C. motor. The compensation, in an A. C. system takes the form of regulated armature inductive reactance and regulated field reactance either inductive or capacitive, or combinations of both in some designs.

The armature of any A. C. motor has some inherent inductance. If the value of this inductance, determined by other factors in the design, is not sufficient, it may be augmented by additional armature inductance either in the form of a reversed "compensating" winding in the armature or, by a choke coil 301 exterior of the motor casing and in series with the armature as shown in Fig. 6.

In the event that the armature reactance is already too great in the particular motor design being considered, it may be reduced to the correct value by means of a compensating winding connected in conventional fashion, but of such value as to compensate only partially for the armature reactance to achieve the object outlined above. In most designs, however, it is likely that the armature reactance will need to be increased rather than reduced.

The value of the inductance to be included in the armature circuit depends upon several factors, namely;

(a) Field strength, which should be weak, in order to obtain as high a power factor as possible, and further to allow a light weight, high speed design.

(b) Total armature reactance—including both the inherent reactance of the armature and any additional reactance inserted in the circuit. It must be great enough to limit the current flow to a safe value when the field is opened.

(c) Phase angle between the current in the armature and the field. This angle varies with internal resistance, equivalent load resistance and reactance in the armature, and with the resistance and reactance of the field. The phase angle should be as small as possible for all conditions of load, favoring the full load condition in most cases. It may be adjusted by changing the armature inductance, or (as is most likely to be the case) if the value of the armature inductance is already fixed by condition (b) above, varying the field reactance.

The field reactance may be decreased by adding capacitance as illustrated by the condenser 302 which is inductively coupled to the conductor 150a of Fig. 6. This condenser could be inserted primarily in the field circuit but has preferably inductively coupled in by means of a transformer 303 as shown in Fig. 6. Use of a coupling transformer 303 as shown in Fig. 6 enables smaller condensers to be used in cases where the required series capacitance is very large, as the equivalent capacitance varies with the square of the transformer turns ratio.

The field reactance may be increased, if necessary, by adding series inductance.

Referring to the vector diagram of Fig. 9, the symbol employed have the following meanings:

$Z_f$=field impedance
$Z_a$=armature impedance
$X_f$=field reactance
$X_a$=armature reactance
$R_f$=field resistance
$R_a$=armature resistance (internal)
$\theta_f$=phase angles, field
$\theta_a$=phase angle, armature
$R_l$=equivalent resistance of load
$a$=phase angle between armature and field
$\phi$=flux in field
$V$=line volts
$I_a$=armature current
$K$=constant
$n$=revolutions per second
$T$=torque developed
$P$—output power The following relationships prevail, and must be taken into account $$I_a = \frac{V}{Z_a} = V[(R_a+R_1)^2 + X_a^2]^{-1/2}$$
$$T = K\phi I_a \cos\alpha = K\phi V \cos\alpha \, [(R_a+R_1)^2 + X_a^2]^{-1/2}$$
$$P = 2\pi n T = K I_a^2 R_1$$

The angles $\theta_t$ and $\theta_a$ should, as nearly as possible, approach equality under full load, and yet still be not too far apart at standstill. That is, $\alpha$ should be as nearly zero as possible at full load, consistent with sufficient torque when the rotor is locked. Since the current will be higher with the rotor locked, some deviation of $\theta_t$ from $\theta_a$ can be permitted in this condition.

$R_t$ will be constant for any given motor and $X_t$ will have a given value which may be varied by means of compensation of the condenser transformer type shown in Fig. 6. These factors establish $Z_t$.

$R_a$ is negligible, in a practical design, but $R_1$ will vary directly with load. Some $X_a$ will be inherent with the armature, and may be supplemented by reversed, "compensating" windings or a choke coil 301 as shown in Fig. 6. These factors establish $Z_a$.

The form of the invention disclosed in Fig. 6 may be advantageously used in the azimuth drive and in the elevation drive of Figs. 1 and 2.

In the form of the invention disclosed in Fig. 7, the power motor and the speed responsive control means therefor may be the same as the corresponding parts of the mechanism disclosed in Fig. 4. The same reference numerals employed in Fig. 4 have accordingly been applied to the corresponding parts in Fig. 7, with the subscript "b" added in each instance, and these parts will not be further described in detail.

Current flow through the armature of motor 141b is automatically limited to safe values while making the maximum power available under high speed, full load conditions by interposing the armature of an auxiliary motor 401 between conductors 146b and 143b in series with the armature of motor 141b.

The motor 401 is a shunt motor having two opposed field windings 402 and 403. When the line switch is closed, current flows continuously through winding 402. The path is from 142b through a conductor 404 which includes a fixed resistor 405, winding 402, and conductor 406 to 143b. Winding 403 is open circuited when the motor 141b is not running, but is rendered active whenever either field winding of motor 141b is energized. The connection through winding 403 is from 404 through conductor 407, winding 403, conductor 408, a switch arm 409, contact 410, and a conductor 411 to 143b. Switch arm 409 is normally held open by a spring 412, but, by virtue of relay 187b, is closed upon contact 410 when the control member 160b is operated to close the circuit of either of the field windings 148b, 149b of the power motor 141b.

The output power of motor 401 is dissipated through any suitable brake. As illustrated, the armature shaft 413 carries a rotor 414 upon which friction shoes 415 are pivotally mounted. The shoes 415 cooperate with a stationary friction drum 416.

With the system energized and the control member 160b in the neutral position, only the winding 402 of motor 401 will be energized. Motor 401 will, therefore, run at its maximum speed. The counter-electromotive force in the armature circuit of the motor 401 is proportional to speed, and may be considered the equivalent of resistance opposing current flow through the armature of motor 401 and through the series connected armature of motor 141b.

When the control member 160b is operated to energize one or the other of the field windings 148b, 149b of motor 141b, and thereby to set the motor 141b into operation, initial current flow through the armature of motor 141b is held to safe limits by the relatively high counter-electromotive force of 401.

Since the fields 402 and 403 are in opposed relation to one another, and since the field 403 is energized whenever either field of motor 141b is energized, one consequence of operating control member 160b to set motor 141b into operation is to effect a slowing down of the motor 401. Thus as motor 141b gains speed, motor 401 loses speed, and as the counter-electromotive force of motor 141b increases, the counter-electromotive force of motor 401 diminishes. More power is progressively made available for motor 141b as motor 401 slows down, but without liability of burning out the armature of motor 141b.

Field winding 403 and its circuit may be caused to bear any desired relation to field winding 402 and the circuit of 402 suitable for securing the character of operation desired. For reasons pointed out in connection with Fig. 4, however, it is not desirable that the counter-electromotive force of motor 141 shall exceed one-half the line voltage. Hence, it is desirable that the counter-electromotive force of motor 401, plus any I. R. drop of the common armature circuit of the two motors, shall never be less than one-half of the line voltage.

If the circuit of 403 is made exactly equal in all respects with the circuit of 402, and if both circuits were permitted to be energized for a protracted period, the winding 403 would cancel out the winding 402, and the motor 401 would be brought to rest. This condition is not desired, nor will it occur in the illustrative apparatus, for 403 is energized only intermittently while 402 is energized continuously. Under stabilized operating conditions of motor 141 the active field winding of that motor is energized and deenergized alternately for equal periods, and hence the winding 403 is likewise energized and deenergized alternately for equal periods. Since the winding 402 under these conditions is substantially balanced or canceled out half the time and is substantially unopposed by 403 half the time, the motor 401 under the conditions described will run at substantially one-half the maximum speed which it attains when the motor 141b is idle. The counter-electromotive force of motor 401, therefore, varies between a maximum value sufficient to protect the armature of motor 151b when the latter is idle, and a minimum value substantially equal to one-half the maximum. As already noted, however, this speed relationship can be varied by varying the characteristics of the circuits of windings 402 and 403 relative to one another, if required or permitted by operating requirements or by characteristics of design of the other parts. More particularly, it will be noted that the motor 401 may be allowed to drop to a lesser speed if a fixed resistance of substantial value is interposed in the common circuit of the armatures of motors 141b and 401.

The mechanism of Fig. 7 may be utilized to advantage in both the elevation drive and the azimuth drive of Figs. 1 and 2.

The form of the invention illustrated in Fig. 10 is adapted for direct current operation, and is general'y similar to the form of the invention disclosed in Fig. 4. The reference numerals employed in connection with Fig. 4 have accordingly been applied to the corresponding parts, and no further detailed description will be given of these parts.

The means for regulating and adjusting the resistance in circuit with the armature of the motor in Fig. 10 is different from the corresponding means disclosed in connection with Fig. 4. Conductor 146c is connected to fixed resistances 501 and 502. Resistance 501 is constantly connected in series with the armature of motor 141c, but resistance 502 which is arranged in parallel with 501 is cut in and out in response to operation of control member 160c. Resistance 501 is connected through conductors 503, 504 and 505 with line conductor 143c. Resistance 502 is adapted to be connected with line conductor 143c through a conductor 506, switch contact 507, switch member 508, switch contact 509 and conductors 504 and 505.

In the normal or at rest condition of the motor 141c resistance 502 is open circuited, switch member 508 being held away from contacts 507 and 509 by means of a spring 510, and being adapted to be closed by a relay 511 when the control member 160c is in a position corresponding substantially to one-half the maximum speed for which the control member 160c may be set. For energizing relay 511, line conductor 142c is connected through a conductor 512 with armature 157c of the manual control member 160c. Armature 167c carries a pair of contacts 513 and 514 for engaging, respectively, contacts 515 and 516. The normal spacing of contact 515 from the contact 513 is such that 513 and 515 will become engaged after a predetermined movement of the control member 160c from the neutral position as already referred to. After such engagement has been established, the control member is still free to continue its movement, the contact 515 being mounted so that it may be yieldingly forced back by the contact 513 but will be resiliently returned to its normal position when the pressure of contact 513 against it is withdrawn. The relationship of contact 516 to contact 514 is the same as that of contact 515 to 513.

When engagement is established either between 513 and 515 or between 514 and 516, current flows from armature 167c through the engaged pair of contacts, and thence through either of two parallel conductors 517, 518 to a conductor 519. From conductor 519 the path continues through the winding of relay 511 and thence through a conductor 520 and conductor 505 to line conductor 143c.

So long as the control member 160c has not been displaced from neutral far enough to engage 513 with 515 or 514 with 516, resistance 502 is not connected in circuit with the armature of motor 141c. As soon as engagement of either pair of contacts is effected, however, relay 511 is energized and switch member 508 is caused to close upon contacts 507 and 509 for connecting resistance 502 in series with the armature of motor 141c, but in parallel with resistance 501. This brings about a lowering of the resistance in series with the armature of motor 141c, so that more power is made available for driving the motor in the higher range of speeds. The parallel arrangement of the resistances 501 and 502 is an advantageous one for the reason that the resistance of the armature circuit is reduced to enable more current to flow by adding an additional resistance path rather than by cutting resistance out of the circuit. Resistance 502 is thus caused to assist resistance 501 in absorbing and dissipating the heat developed by the flowing current.

The disclosed mechanism provides two steps of resistance in series with the armature of motor 141c. Additional steps may be provided, however, by providing additional resistance elements in parallel with 501 and 502 together with means for switching in the resistances successively at successive points in the operation of the manual control member. The two step arrangement, however, has been found to work well in practice and will generally meet all practical requirements.

The mechanism diagrammatically illustrated in Fig. 10 may be advantageously used in the elevation drive and in the azimuth drive of Figs. 1 and 2.

While the point has been stressed that the various forms of electric drive illustrated may be advantageously employed in the azimuth and elevation drives of Figs. 1 and 2, it should be observed that such use is referred to by way of illustration and not of limitation. Any one of the electric drives disclosed may be employed in any situation in which a variable output speed under the control of an operator is wanted.

We have described what we believe to be the best embodiments of our invention. We do not wish, however, to be confined to the embodiments shown, but what we desire to cover by Letters Patent is set forth in the appended claims.

What is claimed is:

1. A reversible, adjustable speed, electric drive comprising, in combination, a shunt wound motor having an armature and a pair of opposed field windings, circuit means for connecting the armature in circuit with a source of current supply, circuit means for rendering the field windings alternatively effective that one to drive the motor in one direction and the other to drive the motor in the opposite direction, comprising a first pair of contacts for establishing a circuit including the first of said field windings but not the second, and a second pair of contacts for establishing a circuit including the second of said field windings but not the first, each pair of contacts including a manually settable contact and a cooperative speed responsive contact, a manual control member operable selectively in opposite directions from a neutral position throughout a prescribed range to cause one or the other pair of contacts to become engaged, means for causing the engaged contacts to be pressed together with progressively increased force as the extent of departure of the manual control member from neutral is increased, and means operated by the motor for shifting the engaged speed responsive contact out of engagement with the cooperative manually settable contact against the force tending to hold them in engagement, when the motor speed exceeds a value characteristic of the position to which the manual control member has been moved, said means operated by the motor for shifting the speed responsive contacts out of engagement with the manually settable contacts comprising a generator driven by the motor, and a galvanometer operated by the generator and including a galvanometer output arm for shifting the speed responsive contacts.

2. A reversible, adjustable speed, electric drive comprising, in combination, a shunt wound motor having an armature and a pair of opposed field windings, circuit means for connecting the armature in circuit with a source of current supply, circuit means for rendering the field windings alternatively effective the one to drive the motor in one direction and the other to drive the motor in the opposite direction, comprising a first pair of contacts for establishing a circuit including the first of said field windings but not the second, and a second pair of contacts for establishing a circuit including the second of said field windings but not the first, each pair of contacts including a manually settable contact and a cooperative speed responsive contact, a manual control member operable selectively in opposite directions from a neutral position throughout a prescribed range to cause one or the other pair of contacts to become engaged, means for causing the engaged contacts to be pressed together with progressively increased force as the extent of departure of the manual control member from neutral is increased, and means operated by the motor for shifting the engaged speed responsive contact out of engagement with the cooperative manually settable contact against the force tending to hold them in engagement, when the motor speed exceeds a value characteristic of the position to which the manual control member has been moved, said means operated by the motor for shifting the speed responsive contacts out of engagement with the manually settable contacts comprising a generator driven by the motor in harmony with the speed and direction of the latter, and a galvanometer operated by the generator including an output arm for operating the speed responsive contacts in one direction or the other according to the direction of rotation of the motor and with a force which varies with the motor speed.

3. A reversible, adjustable speed, electric drive comprising, in combination, a shunt wound motor having an armature and a pair of opposed field windings, circuit means for connecting the armature in circuit with a source of current supply, circuit means for rendering the field windings alternatively effective the one to drive the motor in one direction and the other to drive the motor in the opposite direction, comprising a first pair of contacts for establishing a circuit including the first of said field windings but not the second, and a second pair of contacts for establishing a circuit including the second of said field windings but not the first, each pair of contacts including a manually settable contact and a cooperative speed responsive contact, a manual control member operable selectively in opposite directions from a neutral position throughout a prescribed range to cause one or the other pair of contacts to become engaged, means for causing the engaged contacts to be pressed together with progressively increased force as the extent of departure of the manual control member from neutral is increased, and means operated by the motor for shifting the engaged speed responsive contact out of engagement with the cooperative manually settable contact against the force tending to hold them in engagement, when the motor speed exceeds a value characteristic of the position to which the manual control member has been moved, said means operated by the motor for shifting the speed responsive contacts out of engagement with the manually settable contacts comprising a generator driven by the motor in harmony with the speed and direction of the latter, and a galvanometer operated by the generator including an output arm for operating the speed responsive contacts in one direction or the other according to the direction of rotation of the motor and with a force which varies with the motor speed, and said means further including a center connected rheostat in series with the generator and galvanometer and a sliding contact operated by the manual control member away from the center point of the rheostat upon movement of the manual control member away from the normal neutral position thereof, so that the effective resistance of said rheostat is caused to increase in accordance with the extent of departure of the manual control member from neutral in either direction.

4. An electric drive comprising, in combination, a shunt wound motor which includes an armature and a field winding, circuit means for connecting the armature in circuit with a source of current supply, circuit means comprising a pair of cooperative contacts for rendering the field winding effective and ineffective to drive the motor, a manual control member operable away from an at rest position for setting the first contact in engagement with the second, means for causing the contacts to be pressed together with progressively increased force as the extent of departure of the manual control member from the at rest position is increased, and speed responsive means operated by the motor for disengaging said contacts and maintaining them disengaged against the force tending to hold them engaged whenever the motor speed exceeds a speed characteristic of the position to which the manual control member has been moved, a plurality of fixed resistance elements connected in series with the motor armature but in parallel with one another, one of said resistance elements being constantly connected in a closed circuit path with the armature and a source of electrical energy, and another being normally open circuited, and means responsive to the manual control member for closing the circuit of the latter resistance element when the manual control member has been moved away from the at rest position thereof to a predetermined extent.

5. A reversible adjustable speed electric drive comprising, in combination, a reversible motor, circuit means for supplying driving energy to drive the motor selectively in one direction or the other, comprising a first pair of contacts for establishing a circuit to drive the motor in one direction, and a second pair of contacts for establishing a circuit to drive the motor in the opposite direction, each pair of contacts including a manually settable contact and a cooperative speed responsive contact, a manual control member operable selectively in opposite directions from a neutral position throughout a prescribed range to cause one or the other pair of contacts to become engaged, means for causing the engaged contacts to be pressed together with progressively increased force as the extent of departure of the manual control member from neutral is increased, and means operated by the motor for shifting the engaged speed responsive contact out of engagement with the cooperative manually settable contact against the force tending to hold them in engagement, when the motor speed exceeds a value characteristic of the position to which the manual control member has been moved, said means operated by the motor for shifting the speed responsive contacts out of engagement with the manually settable contacts comprising a generator driven by the motor, and a galvanometer operated by the generator and including a galvanometer output arm for shifting the speed responsive contacts.

CENTRAL HANOVER BANK AND
             TRUST COMPANY,
*Corp. Executor of the Estate of Peter J. McLaren, Deceased.*
    By E. E. BREMNER,
             *Asst. Treasurer.*
    JOHN A. VAUGHAN.
    MACON FRY.

REFERENCES CITED

The following references are of record in the file of this patent:

UNITED STATES PATENTS

| Number | Name | Date |
|---|---|---|
| 2,332,611 | Spencer | Oct. 26, 1943 |

Certificate of Correction

Patent No. 2,456,522. December 14, 1948.

PETER J. McLAREN, DECEASED, BY CENTRAL HANOVER BANK AND TRUST COMPANY, EXECUTOR, ET AL.

It is hereby certified that error appears in the printed specification of the above numbered patent requiring correction as follows:

Column 20, line 43, claim 1, for the word "that" read *the*;

and that the said Letters Patent should be read with this correction therein that the same may conform to the record of the case in the Patent Office.

Signed and sealed this 12th day of April, A. D. 1949.

[SEAL]

THOMAS F. MURPHY,
*Assistant Commissioner of Patents.*